United States Patent
Epstein et al.

(10) Patent No.: US 6,530,021 B1
(45) Date of Patent: Mar. 4, 2003

(54) METHOD AND SYSTEM FOR PREVENTING UNAUTHORIZED PLAYBACK OF BROADCASTED DIGITAL DATA STREAMS

(75) Inventors: Michael Epstein, Spring Valley, NY (US); Michael Pasieka, Thornwood, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/323,808

(22) Filed: Jun. 2, 1999

Related U.S. Application Data

(60) Provisional application No. 60/093,402, filed on Jul. 20, 1998.

(51) Int. Cl.$^7$ ................................................. G06F 1/24
(52) U.S. Cl. ..................... 713/176; 713/161; 713/168; 713/170
(58) Field of Search ................. 713/161, 168, 713/170, 176, 200, 201

(56) References Cited

U.S. PATENT DOCUMENTS

| | | | | |
|---|---|---|---|---|
| 6,122,403 A | * | 9/2000 | Rhoads ........................ | 382/233 |
| 6,131,162 A | * | 10/2000 | Yoshiura et al. .............. | 380/28 |
| 6,216,228 B1 | * | 4/2001 | Chapman et al. ........... | 380/206 |
| 6,233,347 B1 | * | 5/2001 | Chen et al. .................. | 382/100 |
| 6,396,937 B2 | * | 5/2002 | Chen et al. .................. | 382/100 |

FOREIGN PATENT DOCUMENTS

| | | | | |
|---|---|---|---|---|
| EP | 0716544 | 12/1995 | .......... | H04N/5/913 |
| EP | 0750423 | 6/1996 | .......... | H04N/7/167 |
| EP | 0859503 | 8/1998 | ............ | H04N/1/00 |
| WO | WO9743853 | 5/1997 | .......... | H04N/5/913 |
| WO | WO9724832 | 7/1997 | ............ | H04L/9/14 |
| WO | WO9833325 | 1/1998 | ............ | H04N/7/50 |
| WO | WO9824236 | 6/1998 | .......... | H04N/7/167 |

OTHER PUBLICATIONS

Linnartz et al., "Philips Electronics response to call for proposals issued by the Data Hiding Subgroup copy protection technical working subgroup", Online, 1997, XP002118336, Retrieved form the Internet: ≦URL:http://www.dvcc.com/dhsg, filename "philips_dhsg.rtf" "Proposals".

Sections II.a "Basic system concept" and II.b Authorization ticket: a cryptographically secured CGMS system of section II "Copy–control system concept".

* cited by examiner

*Primary Examiner*—Thomas R. Peeso
(74) *Attorney, Agent, or Firm*—Daniel J. Piotrowski

(57) ABSTRACT

A method and system are provided for preventing the unauthorized playback of broadcasted digital data streams. The method includes the step of embedding a watermark in a digital data stream. The digital data stream having the embedded watermark is encrypted. The encrypted digital data stream is broadcasted with a ticket. The encrypted digital data stream and the ticket are received. The ticket is saved and the encrypted digital data stream is provided to a decryption device to decrypt the digital data stream. The decrypted digital data stream is received from the decryption device. The watermark is extracted from the decrypted digital data stream. A one-way cryptographic hashing function is applied to the saved ticket. The hashed ticket is compared to the extracted watermark. Playback of the digital data stream is prevented, when the hashed ticket does not match the extracted watermark.

11 Claims, 3 Drawing Sheets

METHOD AND SYSTEM FOR PREVENTING UNAUTHORIZED PLAYBACK OF BROADCASTED DIGITAL DATA STREAMS

This application claims benefit of Ser. No. 60/093,402, filed Jul. 20, 1998.

BACKGROUND

1. Technical Field

The present invention relates generally to broadcast transmissions and, in particular, to a method and system for preventing unauthorized playback of broadcasted digital data streams.

2. Background Description

In the current environment of networks and with the proliferation of digital and digitized multimedia content which may be distributed over such networks, a key issue is copyright protection. Copyright protection is the ability to prevent or deter the proliferation of unauthorized copies of copyrighted works.

A significant problem in the digital world is that an unlimited number of perfect copies may be made from any piece of digital or digitized content. A perfect copy means that if the original is comprised of a given stream of numbers, then the copy matches the original, exactly, for each number in the stream. Thus, there is no degradation of the original signal during the copy operation. In an analog copy, random noise is always introduced, which degrades the copied signal.

The act of making unlicensed copies of some content, whether digital or analog, audio, video, software of other, is generally referred to as piracy. Piracy has been committed for the purpose of either profit (e.g., selling such unlicensed copies) or to procure a copy of the content for personal use without having to pay for it. The definition of piracy has also been extended to cover the situation when copies of protected materials are distributed without profit. The problem of piracy is worse for digital content. This is because once a pirate finds a way to defeat any existing protection schemes implemented to guard against piracy, he may then make an unlimited number of copies without any degradation in the quality of the copies. On the other hand, in the analog world, there is generally a degradation in the content (signal) with each successive copy, thereby imposing a sort of natural limit on the volume of piracy.

In general, three approaches have been implemented to protect copyrights. They are encryption (the process of encoding data for security purposes), copy protection, and content extensions. Copy protection and content extensions generally apply to the digital world, while a scheme related to encryption, typically referred to gas scrambling, may be applied to an analog signal. This is commonly found in analog cable systems.

Encryption scrambles the content which, once it has been encrypted, cannot be used until it is decrypted or unscrambled. For example, encrypted video may appear as random patterns on a screen. The principle of encryption is that you are free to make as many copies as you desire, but you cannot view anything which is coherent until you decrypt it using a special key. The key is obtained upon paying for the protected content. However, encryption schemes are not without deficiency. For example, a pirate could buy a single, encrypted copy of some content, which he is entitled to decrypt. Then, the pirate could make unlimited copies of the decrypted copy.

Copy protection includes various methods by which a software engineer can write software so as to determine if it has been copied and, if so, to deactivate itself. However, this scheme has been pretty much abandoned since such methods have historically been circumvented.

Content extension refers to any system which attaches some extra information to the original content which indicates whether or not a copy may be made. A software or hardware system must be specifically built around this scheme to recognize the additional information and interpret it in an appropriate manner. Such software or hardware is generally referred to as being "compliant" with the scheme. An example of a content extension system is the Serial Copyright Management System embedded in Digital Audio Tape (DAT) hardware. Under this system, additional information is stored on the disc immediately preceding each track of audio content which indicates whether or not it can be copied. The hardware reads this information and uses is accordingly.

Information, such as that added in a content extension scheme, may be incorporated into content to be protected through the use of a watermark. The idea behind a watermark is that it should not be able to be removed from the item it corresponds to without actually destroying that item. In the digital domain, a digital watermark is a imperceptible or preferably invisible identification code that is permanently embedded in the data and, thus, remains present within the data after any decryption process. Unfortunately, copyright protection techniques implementing watermarking have also been historically defeated. For example, many techniques implementing watermarking have been defeated by a technique referred to as averaging. Moreover, some watermarking techniques may be defeated by simply ignoring the watermark (i.e., by not complying with the watermarking scheme).

The above problems are compounded by the proliferation of digital devices. For example, digital televisions (e.g., high definition television (HDTV)) are now being developed and marketed which enable playback of input digital signals, as compared to conventional televisions which receive an analog input signal. FIG. 1 is a block diagram of a conventional digital television 100. The television 100 includes: a receiver 102; a conditional access (CA) module 104; and a bus 106 operatively connecting receiver 102 and CA module 104.

In operation, a signal is extracted from the airwaves via an antenna 108 and input to receiver 102. The receiver 102 forwards the signal to CA module 104 which decrypts the signal and then forwards the decrypted signal back to receiver 102. Since bus 106 could be potentially tapped, a non-compliant recorder/player could masquerade as receiver 102 and make a bit-for-bit copy of, for example, a pay-per-view program, on this bus. Thus, the bit-for-bit copy would be made after the signal has been decrypted by CA module 104. The non-compliant recorder/player could then masquerade as CA module 104 so that the illicitly recorded program is displayed on receiver 102. In such a case, receiver 102 is sent decrypted content (by the non-compliant recorder/player) and assumes the content is legitimate. Additionally, the recording can be transmitted to a network of non-compliant playback devices.

Thus, it would be desirable and highly advantageous to have a method and system for preventing unauthorized playback of broadcasted data streams such as digital video streams.

SUMMARY OF THE INVENTION

The present invention is directed to a method and system for preventing unauthorized playback of digital data streams.

In one aspect of the present invention, a method for preventing unauthorized playback of digital data streams comprises the steps of:

embedding a watermark in a digital data stream;

encrypting the digital data stream having the embedded watermark;

broadcasting the encrypted digital data stream with a ticket;

receiving the encrypted digital data stream and the ticket;

saving the ticket and providing the encrypted digital data stream to a decryption device to decrypt the digital data stream;

receiving the decrypted digital data stream from the decryption device;

extracting the watermark from the decrypted digital data stream;

applying a one-way cryptographic hashing function to the saved ticket;

comparing the hashed ticket to the extracted watermark; and preventing playback of the digital data stream, when the hashed ticket does not match the extracted watermark.

In another aspect of the present invention, a system for preventing unauthorized playback of broadcasted digital data streams comprises:

a bus;

a conditional access module operatively coupled to the bus configured for decrypting encrypted digital data streams;

a receiver operatively coupled to the bus configured for receiving an encrypted digital data stream having a watermark embedded therein and a ticket, saving the ticket, providing the encrypted digital data stream to the conditional access module, and receiving a decrypted digital data stream from the conditional access module, the receiver comprising:

an extractor configured for extracting the watermark from the decrypted digital data stream;

a hashing module configured for applying a one-way cryptographic hashing function to the saved ticket; and a comparison module configured for comparing the hashed ticket to the extracted watermark; and an inhibitor configured for preventing playback of the digital data stream when the hashed ticket does not match the extracted watermark.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

Figure 1:
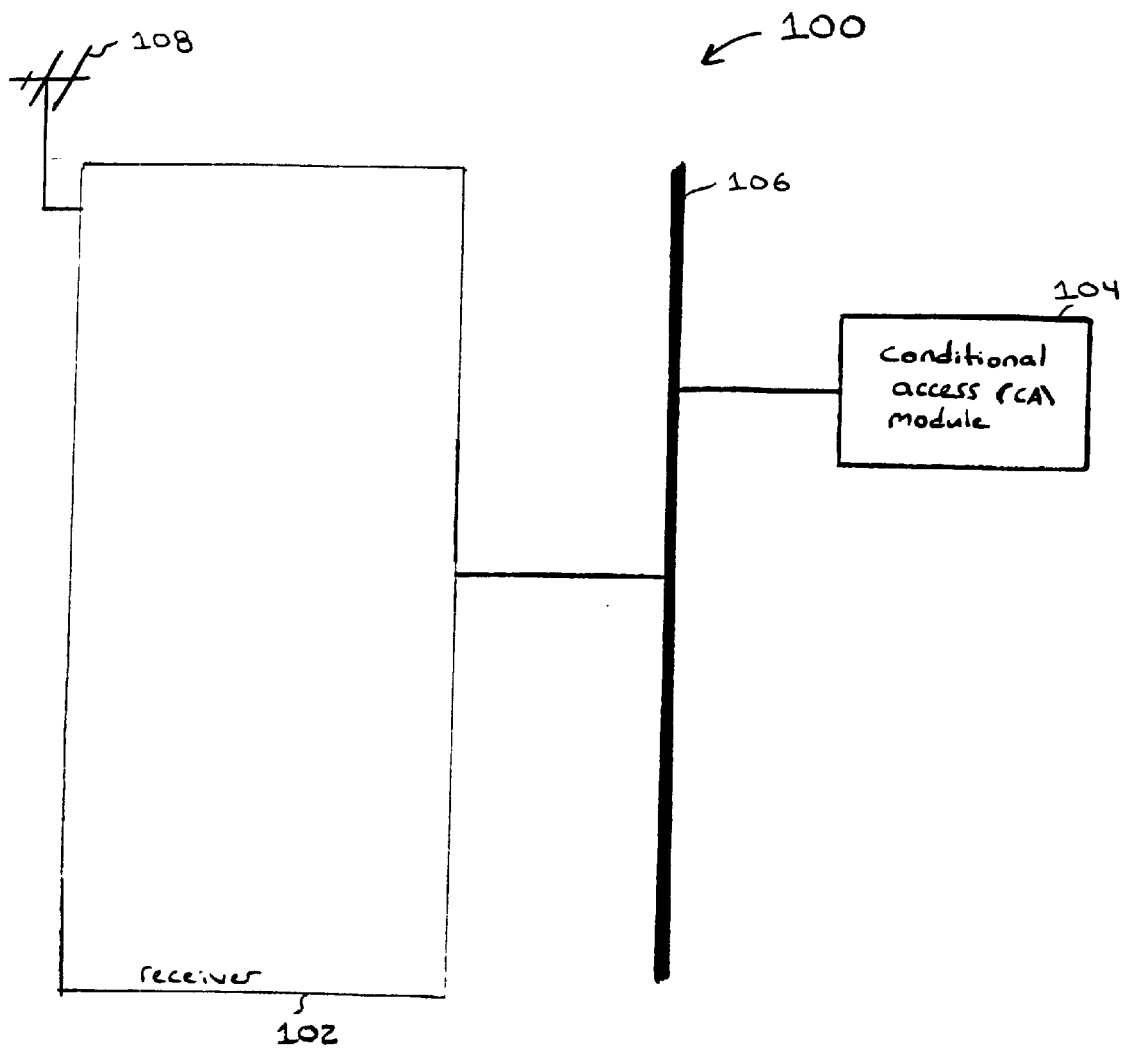
FIG. 1 is a block diagram of a conventional digital television.

The present invention is directed to a method and system for preventing unauthorized playback of digital data streams which are legally broadcast, such as, for example, pay-per-view programs. In its most basic form, a playback device such as, for example, a digital television, tests the copyright status of received content and refuses to play such content if it is determined to be illegally obtained (e.g., from an unauthorized copy and not a live broadcast).

To this end, the system and method of the present invention rely upon a digital watermark and a reference mechanism referred to herein as a "ticket". Both the digital watermark and the ticket reflect various copy protection states. The digital watermark, or rather the copy protection state reflected by the digital watermark, is fixed. However, the ticket, or rather the copy protection state reflected by the ticket, is (cryptographically) modified as the content it is associated with is processed (e.g., played, recorded, or passed through). When content is to be played or recorded, the digital watermark is compared to the ticket. If the ticket checks against the watermark, the content may be displayed or recorded in accordance with the copy protection state. However, if the watermark and ticket do not correspond to one another, then the content is not displayable or recordable.

A playback control method for physical media (e.g., digital video disks (DVDs)) which uses digital watermarking and a ticket is described in the article "Philips Electronics Response to Call for Proposals Issued by the Data Hiding Subgroup Copy Protection Technical Working Group", by Linnartz et al., Oct. 16, 1997. The Linnartz article also describes two illustrative methods for embedding watermarks in digital data. These two methods may also be used to embed watermarks in digital video streams according to the present invention.

The first method embeds the watermark in the Motion Picture Expert Group (MPEG) coding of the digital video stream. The second method embeds the watermark in the pixel data of the digital video stream. However, as the method for embedding the watermark into the digital video stream is not critical to the present invention, methods other than the two described above may be used in accordance with the present invention. Accordingly, the above two methods and their corresponding advantages and disadvantages are not described herein in further detail herein.

The copy protection states used in accordance with an embodiment of the present invention are shown in Table 1. However, it is to be appreciated that the present invention is not limited to those copy protection states and other copy protection states may be used.

TABLE 1

| | |
|---|---|
| Copy-Never | The content may only be played, but not copied. |
| Copy-No-More | The content may only be played, but not copied. |
| Copy-Once | The content may be played and copied. However, the copy is altered so the content is in the Copy-Never state. |
| Copy-Freely | The content may be played and copied without restriction. |

The above four copy protection states allow for two categories of watermarks according to the embodiment of the present invention. That is, either the watermark classifies the content as "Copy-Once" or "Copy-No-More" or the watermark classifies the content as "Copy-Never". Distinction between "Copy-Once" and "Copy-No-More" is made by the ticket, as explained hereinbelow. "Copy-Freely" is implemented by the absence of a watermark.

Figure 2:
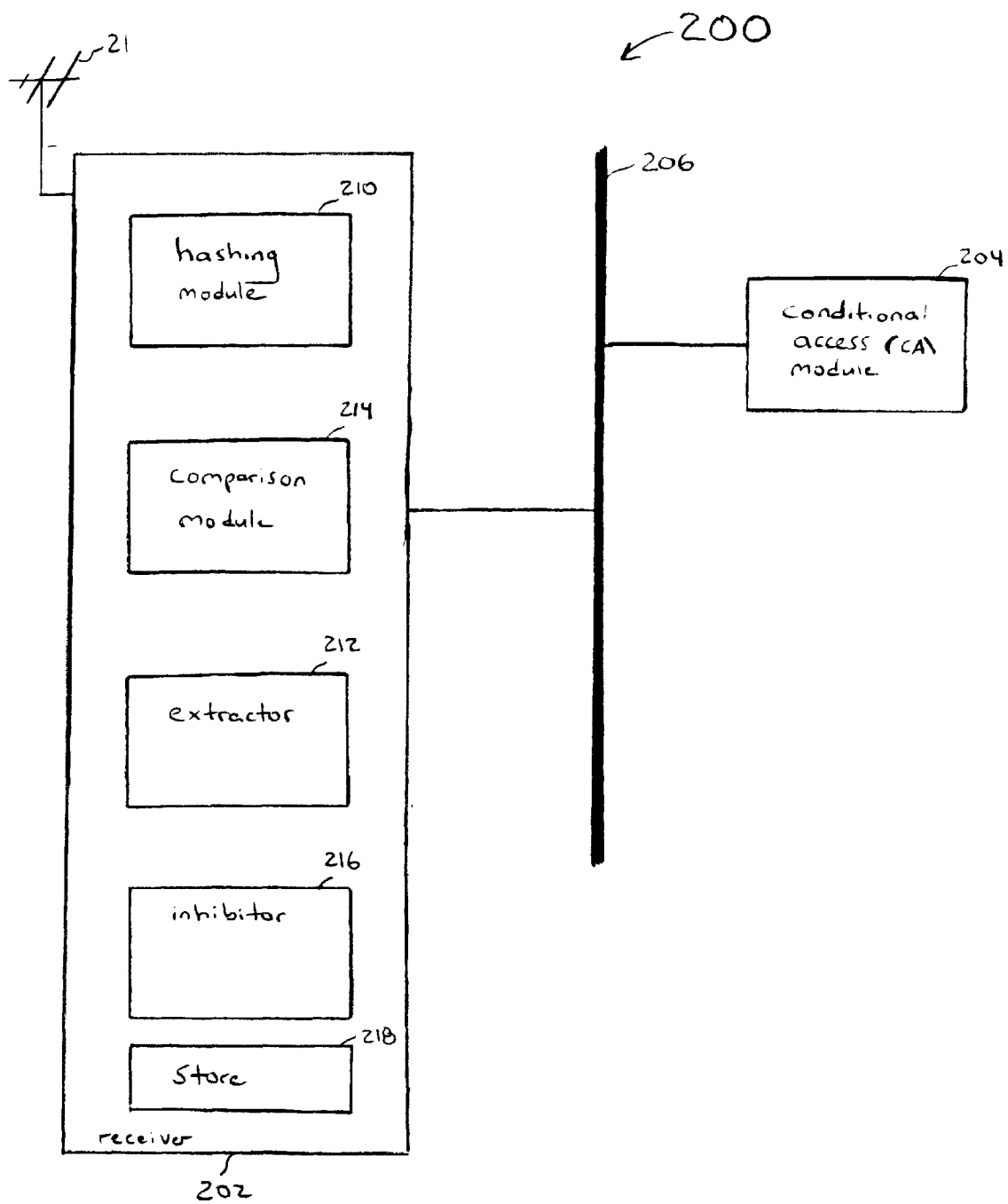
FIG. 2 is a block diagram of a digital television that prevents unauthorized playback of digital data streams in accordance with an embodiment of the present invention.

FIG. 2 is a block diagram of a digital television that prevents unauthorized playback of digital data streams (e.g., digital video streams) in accordance with an embodiment of the present invention. It is to be appreciated that while the present invention is described with reference to a digital television, it may be implemented in any playback device (e.g., analog or digital) to prevent unauthorized playback of copyrighted content (e.g., digital video or audio content).

The digital television 200 includes a receiver 202, a conditional access (CA) module 204, and a bus 206 for operatively coupling receiver 202 and CA module 204. The receiver 202 includes: a hashing module 210; an extractor 212; a comparison module 214; and an inhibitor 216. The bus 206 is intended to be identical to the bus 106 of FIG. 1. In the embodiment, receiver 202 receives a signal via an antenna 218. However, devices other than an antenna may used such as, for example, a satellite dish. Moreover, the signal may be provided directly to receiver 202 via a cable or other direct transmission means. Upon receiving the signal via antenna 218, receiver 202 forwards the signal to CA module 204 which decrypts the signal and then forwards the decrypted signal back to receiver 202.

For the purposes of this description, the following presumptions are made: receiver 202 is compliant (i.e., able to read a watermark and honor a set of rules for licensing the received content (the copy protection states)); CA module 204 is secure; and bus 206 is insecure (e.g., subject to tapping).

As stated above, since. bus 206 could be potentially tapped, a non-compliant recorder/player could masquerade as receiver 202 and make a bit-for-bit copy of, for example, a pay-per-view program, on this bus. Thus, the bit-for-bit copy.would be made after the signal has been decrypted by CA module 204. The non-compliant recorder/player could then masquerade as CA module 204 so that the illicitly recorded program is displayed on receiver 202. In such a case, receiver 202 is sent decrypted content (by the non-compliant recorder/player) and assumes the content is legitimate. Additionally, the recording can be transmitted to a network of non-compliant playback devices.

Figure 3:
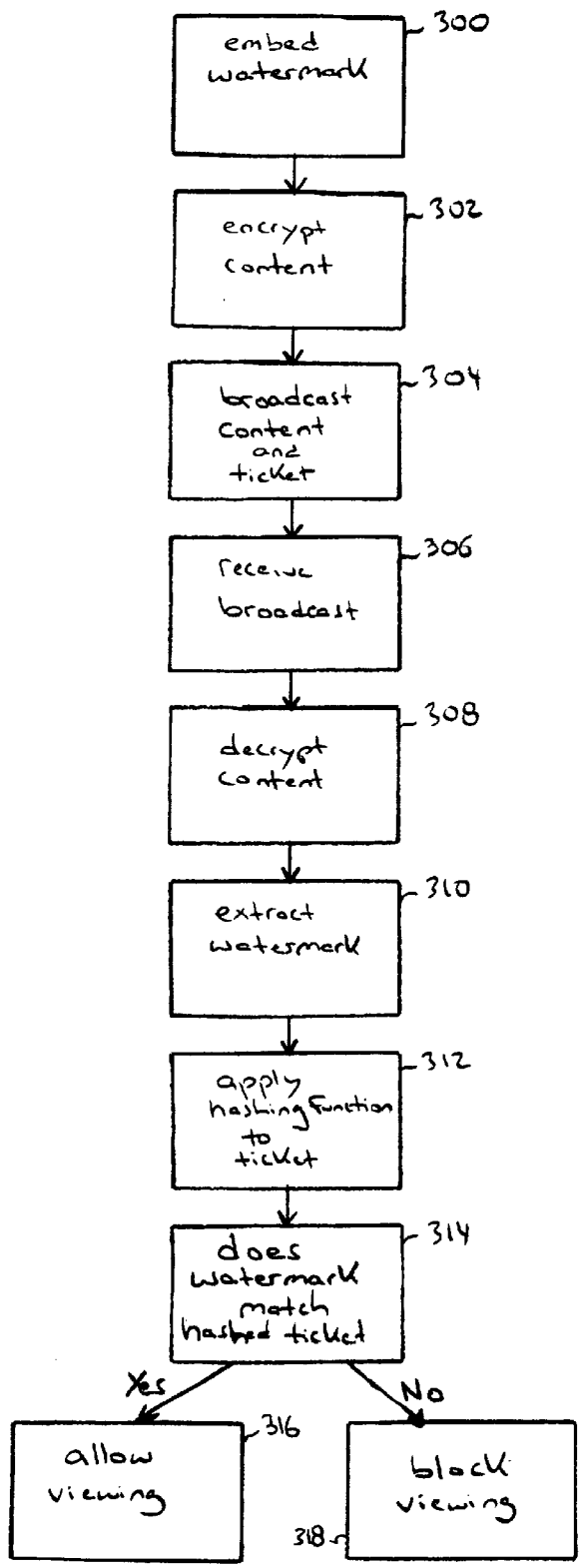
FIG. 3 is a block diagram illustrating a method for preventing unauthorized playback of digital data streams in accordance with an embodiment of the present invention.

Advantageously, the present invention provides a reference "ticket" to prevent compliant receiver 202 from being fooled into accepting content that is not currently being broadcast. An implementation of this ticket is shown in FIG. 3, which is a block diagram illustrating a method for preventing unauthorized playback of digital data streams in accordance with an embodiment of the present invention.

Initially, a watermark is embedded into the content to be protected (step 300). The watermark indicates the copy protection state of the content. In the embodiment of FIG. 3, the content is watermarked as Copy-Never.

The content (and watermark) is then encrypted (step 302). In the case of MPEG video, the MPEG transport packets containing the content (and watermark) are encrypted. The encrypted content and a ticket are then broadcasted (step 304). In the case of MPEG video, the ticket is sent as un-encrypted private MPEG data.

The content and ticket are extracted from the airwaves via antenna 218 and input to receiver 202 of television 200 (step 306). The receiver 202 saves the un-encrypted ticket in store 218 and sends the encrypted content to CA module 204. The CA module 106 then decrypts the content and sends the decrypted content back to receiver 202 (step 308). The extractor 212 of receiver 202 extracts the watermark from the content (step 310). Hashing module 210 of receiver 202 applies a one-way cryptographic hashing function to the ticket twice (step 312). A one-way cryptographic hashing function is an algorithm that generates a fixed string of numbers from a text message such that it is very difficult to turn the fixed string back into the text message. For example, given M, it is easy to compute h. Given h it is hard to compute M such that H(M)=h. Given M, it is hard to find another message, M', such that H(M)=H(M'). For a more detailed description of one-way hash functions, see "Applied Cryptography", Bruce Schneier, John Wiley & Sons, Inc. (1996). The hashed ticket is then compared to the watermark by comparison module 214 (step 314). If the hashed ticket and the watermark match, then the content is displayed (step 316). On the other hand, if the hashed ticket and the watermark do not match, then inhibitor 216 prevents the content from being displayed (step 318). The inhibitor 216 may be realized as hardware or software.(e.g., a piece of code which prevents/allows playback based on the result of comparison module 214.

Inhibitor 216 prevents receiver 202 from displaying content which is put onto bus 206 (between CA module 204 and receiver 202) by a non-compliant playback device. Non-compliant playback of the decrypted content onto this bus fails due to receiver 202 not receiving a ticket from an originally broadcasted digital video stream prior to receiving the content from CA module 204. Since receiver 202 does not have a ticket, no check of the extracted watermark can be performed. Further, since the watermark indicates that the content is Copy-Never and no ticket has been saved from an original broadcast of the digital video stream, receiver 202 refuses to display the content.

The following designations are used to implement the present invention:

P Physical Mark

T Ticket in the current state

W Watermark (or P hashed four times)

A description of the physical mark will now be given. In general, digital information stored on physical media such as, for example, a digital video disc (DVD) may contain a "physical" mark which at least distinguishes between ROM and RAM disks. The physical mark may pertain to a track unavailable to the user for the purpose of playing, but rather only available to the player for the purpose of determining the copy protection state of the disk (or a particular track(s)). As the physical mark is represented by a sequence of numbers, a broadcasted digital video stream may similarly have a "physical" mark associated therewith comprised of a sequence of numbers.

It is the physical mark which is used to generate the ticket. That is, the ticket results by applying a one-way cryptographic hashing function.twice to the physical mark. This is done prior to broadcasting the digital video stream as the ticket is broadcasted with the video stream. Further, as stated above, before the ticket is compared to the watermark (in receiver 202), a one-way cryptographic hashing function is applied twice to the ticket to generate the watermark. This may be represented by the following:

$$T=H(H(P)), W=H(H(T))$$

It is to be appreciated that while the hashing function is applied to the ticket twice in the above example, the hashing function may be applied to the ticket any number of times to generate the watermark. It is to be further appreciated that the ticket that is acquired from the broadcast stream can optionally be destroyed. This may be done after a predefined period of time using, for example, a count down counter or a real time clock. Alternatively, the ticket may be destroyed after power to the television is turned off.

Use of a (cryptographic) reference ticket according to the present invention provides a significantly secure method for preventing unauthorized playback of digital data streams. Thus, the playback of programs and services restricted to those who have paid for the same may be controlled. As such, piracy of such programs and services may be thwarted. Moreover, since piracy results in significant revenue loss, preventing such piracy may conceivably result in the previously pirated content being provided to legitimate consumers at a lower cost.

Although the illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for preventing unauthorized playback of digital data streams, comprising the steps of:

broadcasting an encrypted digital data stream with a ticket, the stream having a watermark embedded therein;

receiving the encrypted digital data stream and the ticket;

saving the ticket and providing the encrypted digital data stream to a decryption device to decrypt the digital data stream;

receiving the decrypted digital data stream from the decryption device;

extracting the watermark from the decrypted digital data stream;

applying a one-way cryptographic hashing function to the saved ticket;

comparing the hashed ticket to the extracted watermark; and preventing playback of the digital data stream, when the hashed ticket does not match the extracted watermark.

2. A method for preventing unauthorized playback of digital data streams, comprising the steps of:

embedding a watermark in a digital data stream;

encrypting the digital data stream having the embedded watermark;

broadcasting the encrypted digital data stream with a ticket;

receiving the encrypted digital data stream and the ticket;

saving the ticket and providing the encrypted digital data stream to a decryption device to decrypt the digital data stream;

receiving the decrypted digital data stream from the decryption device;

extracting the watermark from the decrypted digital data stream;

applying a one-way cryptographic hashing function to the saved ticket;

comparing the hashed ticket to the extracted watermark; and preventing playback of the digital data stream, when the hashed ticket does not match the extracted watermark.

3. The method according to claim 2, wherein said applying.step is performed more than once.

4. The method according to claim 2, further comprising the steps of:

generating the ticket by applying the one-way cryptographic hashing function to a sequence of numbers.

5. The method according to claim 4, wherein the one-way cryptographic hashing function is applied more than once to the sequence of numbers.

6. The method according to claim 2, further comprising the step of allowing playback of the digital data stream, when the hashed ticket matches the extracted watermark.

7. The method according to claim 2, further comprising the step of destroying the ticket.

8. A system for preventing unauthorized playback of broadcasted digital data streams, comprising:

a bus;

a conditional access module operatively coupled to said bus configured for decrypting encrypted digital data streams;

a receiver operatively coupled to said bus configured for receiving an encrypted digital data stream having a watermark embedded therein and a ticket, saving the ticket, providing the encrypted digital data stream to said conditional access module, and receiving a decrypted digital data stream from said conditional access module, the receiver comprising:

an extractor configured for extracting the watermark from the decrypted digital data stream;

a hashing module configured for applying-a one-way cryptographic hashing function to the saved ticket; and a comparison module configured for comparing the hashed ticket to the extracted watermark; and an inhibitor configured for preventing playback of the digital data stream when the hashed ticket does not match the extracted watermark.

9. The system according to claim 8, wherein said hashing module applies the one-way cryptographic hashing function to the ticket more than once.

10. The system according to claim 8, wherein said ticket is destroyed upon entering a power down mode.

11. The system according to claim 8, wherein said ticket is destroyed after a predetermined time period.

* * * * *